(12) United States Patent
Haslacher (10) Patent No.: US 8,308,533 B2
(45) Date of Patent: Nov. 13, 2012

(54) SYSTEM AND METHOD FOR ALLOWING A QUALITY CHECK OF SAUSAGE-SHAPED PRODUCTS (75) Inventor: Helmut Haslacher, Mondsee (AT)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 13/041,330

(22) Filed: Mar. 4, 2011

(65) Prior Publication Data
US 2011/0217913 A1 Sep. 8, 2011

(30) Foreign Application Priority Data

Mar. 5, 2010 (EP) .................................. 10002327

(51) Int. Cl.
A22C 11/00 (2006.01)
(52) U.S. Cl. ........................................................ 452/32
(58) Field of Classification Search .............. 452/30–32, 452/35–37, 46–49, 51
See application file for complete search history.

(56) References Cited

U.S. PATENT DOCUMENTS

| 4,227,668 | A | * | 10/1980 | Ernst ............................. 248/317 |
| 4,345,411 | A | * | 8/1982 | Niedecker .................... 53/134.1 |
| 4,364,511 | A | * | 12/1982 | Wittern et al. .................. 383/71 |
| 4,612,684 | A | | 9/1986 | Kollross |
| 5,100,364 | A | * | 3/1992 | Kollross et al. ............... 452/185 |
| 5,269,116 | A | * | 12/1993 | Roberts et al. ............... 53/138.4 |
| 5,755,022 | A | * | 5/1998 | Whittlesey ...................... 29/788 |
| 6,524,178 | B1 | * | 2/2003 | Fassler et al. .................... 452/37 |
| 6,932,689 | B2 | * | 8/2005 | Stimpfl ............................ 452/49 |
| 7,124,553 | B2 | * | 10/2006 | Norton et al. .................. 53/138.2 |
| 7,294,050 | B2 | * | 11/2007 | Steinke et al. ................... 452/48 |
| 7,479,057 | B2 | * | 1/2009 | Waldstaedt et al. ............. 452/32 |
| 7,647,749 | B2 | * | 1/2010 | Pinto et al. ..................... 53/417 |
| 8,113,925 | B2 | * | 2/2012 | Reitz et al. ...................... 452/48 |

FOREIGN PATENT DOCUMENTS

| EP | 0 330 857 A1 | 9/1989 |
| EP | 1 891 860 A1 | 2/2008 |
| EP | 1 897 446 A2 | 3/2008 |

OTHER PUBLICATIONS

EP10002327.4-1260 Extended European Search Report dated Sep. 7, 2010, 5 pages.

* cited by examiner

Primary Examiner — Richard Price, Jr.
(74) Attorney, Agent, or Firm — Hahn Loeser & Parks LLP; Bret A. Hrivnak, Esq.

(57) ABSTRACT

The invention relates to a system for allowing a quality check of sausage shaped products. The system includes a filling tube for feeding filling material into a tubular packing casing. The system further includes a clipping machine having a displacer unit with at least two pairs of displacer elements for gathering the filled tubular packing casing and for providing a plait-like portion. The system further includes a clipping unit for applying two closure means to the plait-like portion of the tubular packing casing, and a feeding unit for feeding flexible suspension elements to the clipping unit. The system further comprises a discharge device for by-passing the transportation unit by at least one of the sausage-shaped products and for discharging the by-passed sausage-shaped product out of the clipping machine.

15 Claims, 6 Drawing Sheets

SYSTEM AND METHOD FOR ALLOWING A QUALITY CHECK OF SAUSAGE-SHAPED PRODUCTS

This application claims priority to, and the benefit of, European Patent Application No. 10 002 327.4 filed Mar. 5, 2010, which is hereby incorporated by reference.

BACKGROUND OF THE INVENTION

The present invention relates to a system and a method for allowing a quality check of sausage-shaped products according to the preamble of independent claims 1 and 13.

In particular, the present invention relates to a system and a method for allowing a quality check of sausage shaped products, like sausages. The system comprises a filling tube for feeding filling material, like sausage meat, in a feeding direction into a tubular packing casing provided on the filling tube and closed at the front end by a closure means, like a closure clip, a clipping machine having a displacer unit with at least two pairs of displacer elements for gathering the filled tubular packing casing and for providing a plait-like portion which is at least approximately free from filling material, a clipping unit for applying two closure means to the plait-like portion of the tubular packing casing, a first closure means for closing an actually filled tubular packing casing for forming a sausage-shaped product to be produced presently, and a second closure means for closing the front end of the tubular packing casing provided on the filling tube and forming the following sausage-shaped product to be produced next. The system further comprises a feeding unit for feeding flexible suspension elements, like loops, to the clipping unit for being attached to the sausage-shaped product by means of the first or second closure means, the feeding unit includes a positioning device for positioning the flexible suspension element to be attached to the sausage-shaped product. Moreover, the system comprises a transportation unit for transporting the sausage-shaped product out of the clipping machine to a storing device.

From the EP patent application 1 897 446, a production line for producing sausage-shaped products, like sausages, is known. Said known production line comprises a clipping machine for conveying a filling material, like sausage meat, into a tubular packaging casing, gathering the filled tubular casing by respective displacer units and applying closure clips to the gathered casing portion for closing a filled casing portion by a clipping unit. A flexible suspension loop is fed to the clipping unit by a feeding unit and fixed to the sausage-shaped product by a closure clip. For discharging the sausage-shaped product out of the clipping machine and for further transportation of the sausage-shaped product to an automatic hanging line including a storage element, like a smoking rod, a transportation device is provided. Said transportation device includes a first transportation path which comprises a catching element and guide rail for catching and guiding the suspension loop together with the sausage-shaped product attached to the loop in the direction of the hanging line, and a second transportation path following the first transportation path in the transportation direction and including a conveyor belt for conveying the sausage-shaped product lying on the conveyor belt towards the automatic hanging line. The transportation device terminates in a delivery position including a fork-like delivery element for providing the sausage-shaped products hanging thereon by the suspension loops to the conveyer of the automatic hanging line. A hook element of the conveyer of the hanging line engages the loop of the sausage-shaped product provided in the delivery position and conveys said sausage-shaped product to a predetermined position on the smoking rod disposed in the hanging line.

In the production of sausage-shaped products, like sausages, it is important to produce sausages of equal length and weight. Moreover, the efficiency of the production of sausages shall be increased, too. The known production line mentioned above, includes a weighing device integrated into the production line and being provided for measuring in a random testing the weight of a sausage product. The result of the measuring can be used for controlling the production process for sausage-shaped products. Said weighing device includes a lever which may be pivoted into a gap in the transportation path of the sausage-shaped product between the transportation device and the hanging line. The sausage-shaped product can be transferred out of the transportation path to the lever of the weighing device for inspection matters, e.g. to be weighed.

As mentioned above, the weighing device of the known production line is provided after the transportation paths. Thus, the sausage-shaped products have to cover a relatively long distance before the measuring process can occur. If the weight is incorrect, a lot of further sausage-shaped products having an incorrect weight, are produced before the information as to the incorrect weight can be derived from the control of the production of the sausage-shaped products.

BRIEF SUMMARY OF THE INVENTION

Thus, it is an object of the present invention, to provide a system and a method for allowing a quality check of sausage-shaped products mentioned initially, with which the above mentioned drawbacks can be overcome and with which the reaction time of the control can be reduced.

The aforesaid object with respect to the system is achieved by the features of claim 1, whereas the aforesaid object with respect to the method is achieved by the features of claim 13. Advantageous configurations of the invention regarding the system are described in claims 2 to 12, and with regard the method in claims 14 and 15.

According to the present invention, there is provided a system for allowing a quality check of sausage shaped products, like sausages. The system comprises a filling tube for feeding filling material, like sausage meat, in a feeding direction into a tubular packing casing provided on the filling tube and closed at the front end by a closure means, like a closure clip, a clipping machine having a displacer unit with at least two pairs of displacer elements for gathering the filled tubular packing casing and for providing a plait-like portion which is at least approximately free from filling material, a clipping unit for applying two closure means to the plait-like portion of the tubular packing casing, a first closure means for closing an actually filled tubular packing casing for forming a sausage-shaped product to be produced presently, and a second closure means for closing the front end of the tubular packing casing provided on the filling tube and forming the following sausage-shaped product to be produced next. The system further comprises a feeding unit for feeding flexible suspension elements, like loops, to the clipping unit for being attached to the sausage-shaped product by means of the first or second closure means, the feeding unit includes a positioning device for positioning the flexible suspension element to be attached to the sausage-shaped product. Moreover, the system comprises a transportation unit for transporting the sausage-shaped product out of the clipping machine to a storing device.

Additionally, the system comprises a discharge device for by-passing the transportation unit by at least one of the sausage-shaped products and for discharging the by-passed sausage-shaped product out of the clipping machine. The discharged sausage-shaped product may be measured, e.g. weighed, its diameter or length may be checked and/or various other checks may be made, e.g. with regard to the quality of the packing material and/or the closure means. Said measurements may be executed without influencing the production process. Moreover, the measurement apparatuses may be of a high quality and may measure as much as possible without any restriction as to the measurement time. Furthermore, the quality check occurs immediately after the production of the sausage-shaped product so that the reaction time for an intervention of the control of the production process is very short if something is going wrong.

In a preferred embodiment, the transportation unit has at least a catching element for catching the suspension element wherein the discharge device is adapted to by-pass a sausage-shaped product at the catching element. Thus, the by-passing occurs directly after the attachment of the suspension loop at the sausage-shaped product to be by-passed.

It is further advantageous, that the discharge device comprises an engagement element which is reversibly movable between a release position in which the engagement element releases the flexible suspension element actually to be attached to the sausage-shaped product and to be caught by the catching element, and an engaging position in which the engagement element is disposed between the flexible suspension element actually to be attached to the sausage-shaped product and the catching element of the transportation unit. By moving the engagement element into the engagement position, the pathway of the suspension element actually to be attached to the sausage-shaped product is blocked by the engagement element and said suspension element can not be caught by the catching element, whereby a single sausage-shaped product is discharged from the production system. The discharge device or the engagement element, respectively, acts as a deflector for leading the suspension element and thus, the sausage-shaped product out of the system. The discharge process may be individually or automatically actuated, e.g. in regular or random intervals. The sausage-shaped product discharged from the system may then be measured by separate measurement devices without influencing the further production process.

Depending on the kind of drive used to move the engagement element, and the arrangement of the release position, the path way for moving the engagement element can vary. In a preferred embodiment, the engagement element is reversibly movable in the conveying direction of the suspension elements. Alternatively, the engagement element is reversibly movable in a direction at least approximately parallel to the feeding direction. In a further preferred embodiment, a pivot drive may be used to move the engagement element. In this embodiment, the engagement element may be reversibly rotatable about a vertical axis, which is preferably arranged at least approximately perpendicular with respect to the feeding direction.

To avoid collisions between the engagement element and other parts of the clipping machine, the positioning device comprises a guide pin for reversibly guiding the engagement element between the release position and the engagement position. Preferably, the engagement element can comprise a guide slot for interacting with the guide pin. Using such guide slot and guide pin, an accurate positioning of the engagement element is possible, at least in the engagement position.

In a further embodiment, the positioning device advantageously comprises a pivot axis for reversibly pivoting the positioning device between an upper and a lower position, wherein, in the upper position, the positioning device is disposed closed to the catching element, and, in the lower position, the positioning device is moved away from the catching element. While moving the engagement element in the engagement position, the positioning device may be pivoted in the lower position to prevent the suspension loop provided below the catching element, from being damaged by the engagement element. In the upper position, the suspension loop is positioned closer to the catching element, whereby said loop may be surely caught by the catching element.

Alternatively or additionally to the reversible movement of the positioning device between an upper and a lower position, the positioning device may comprise a lifter for locating a flexible suspension elements closed to the catching element. Said lifter can comprise a pivot axis for reversibly pivoting the lifter between an upper and a lower position, wherein, in the upper position, the positioning device is disposed closed to the catching element, and, in the lower position, the positioning device is moved away from the catching element. The movement of the lifter in its lower position may prevent the suspension loop provided below the catching element, from being damaged by the engagement element. In its upper position, the pivotable lifter may assure the catching of the suspension loop.

The lifter may be formed by a lever arranged approximately parallel to the positioning device. In case that the positioning device is formed by a hollow container, the lifter may be arranged inside the positioning device.

In a further preferred embodiment, the lifter comprises a notch which exceeds the positioning device in the region of the catching element, when the lifter is in the upper position. In this upper position, the lifter moves the suspension loop closer to the catching element to increase a sure catching of said loop.

In has to be understood, that the clipping machine comprises at least one drive for automatically driving the discharge device and/or the positioning device and/or the lifter. By providing only one drive for driving the discharge device, the positioning device and the lifter, a coupling device and a respective control unit is necessary to precisely control the movement of said devices. Thus, it is preferred to provide at least a second drive for independently driving the engagement element to reduce the complexity of the drive devices.

According to the present invention, there is further provided a method for allowing a quality check of sausage-shaped products, like sausages. The sausage-shaped products are produced with a system which comprises a filling tube for feeding filling material, like sausage meat, in a feeding direction into a tubular packing casing provided on the filling tube and closed at the front end by a closure means, like a closure clip, a clipping machine having a displacer unit with at least two pairs of displacer elements for gathering the filled tubular packing casing and for providing a plait-like portion which is at least approximately free from filling material, a clipping unit for applying two closure means to the plait-like portion of the tubular packing casing, a first closure means for closing an actually filled tubular packaging casing for forming a sausage-shaped product to be produced presently, and a second closure means for closing the front end of the tubular packing casing provided on the filling tube and forming the following sausage-shaped product to be produced next. The system further comprises a feeding unit for feeding flexible suspension elements, like loops, to the clipping unit for being attached to sausage-shaped products by means of the first or second closure means, wherein the feeding unit includes a positioning device for positioning the flexible suspension element to be attached to the sausage-shaped product. The sausage-shaped products are fed out of the clipping machine by a transportation unit for transporting the sausage-shaped product out of the clipping machine to a storing device.

The method according to the present invention comprises the steps of providing at least one sausage-shaped product, providing a discharge device in the region between the clipping unit and the transportation unit and by-passing the transportation unit by at least one of the sausage-shaped products, and discharging the by-passed sausage-shaped product out of the system or clipping machine, respectively.

The inventive method provides the same advantages as the inventive system, by blocking the path way of the suspension element between the feeding unit and the transportation unit. Blocking the path way of the suspension element between the feeding unit and the transportation unit prevents the suspension element from being caught by a catching element of the transportation unit. The actually produced sausage-shaped product will not be fed out of the clipping machine by the transportation unit, but can be guided to a separate storage or a measuring device or the like to e.g. be measured or quality checked.

If the discharge device includes an engagement element, it is further preferred that the method includes the step of reversibly moving the engagement element between a release position and an engaging position. In the release position, the engagement element releases the flexible suspension element actually to be attached to the sausage-shaped product and to be caught by the catching element of the transportation unit. In the engaging position, the engagement element is disposed between the flexible suspension element actually to be attached to the sausage shaped product and the catching element of the transportation unit, and thereby, it prevents the suspension element to be caught by the catching element.

The clipping machine can include a control unit for controlling the movement of at least the discharge device. A specific program may run to discharge sausage-shaped products in regular or random intervals from the production system to be measured or quality checked. Alternatively or additionally to a program on the basis of fixed or random intervals, a manually actuating of the discharge device may be provided. Moreover, not only one sausage-shaped product may be discharged from the system. It is also possible to discharge more that one sausage-shaped products, for example, two ore more successive sausage-shaped products.

Further advantages and preferred embodiments will be described in the following together with the drawings listed below. The expressions "left", "right", "below" and "above" used in the following description, are referred to the drawings in an alignment such that the reference numbers and the notation of the Figs. used can be read in normal.

DETAILED DESCRIPTION OF THE INVENTION

Figure 1:
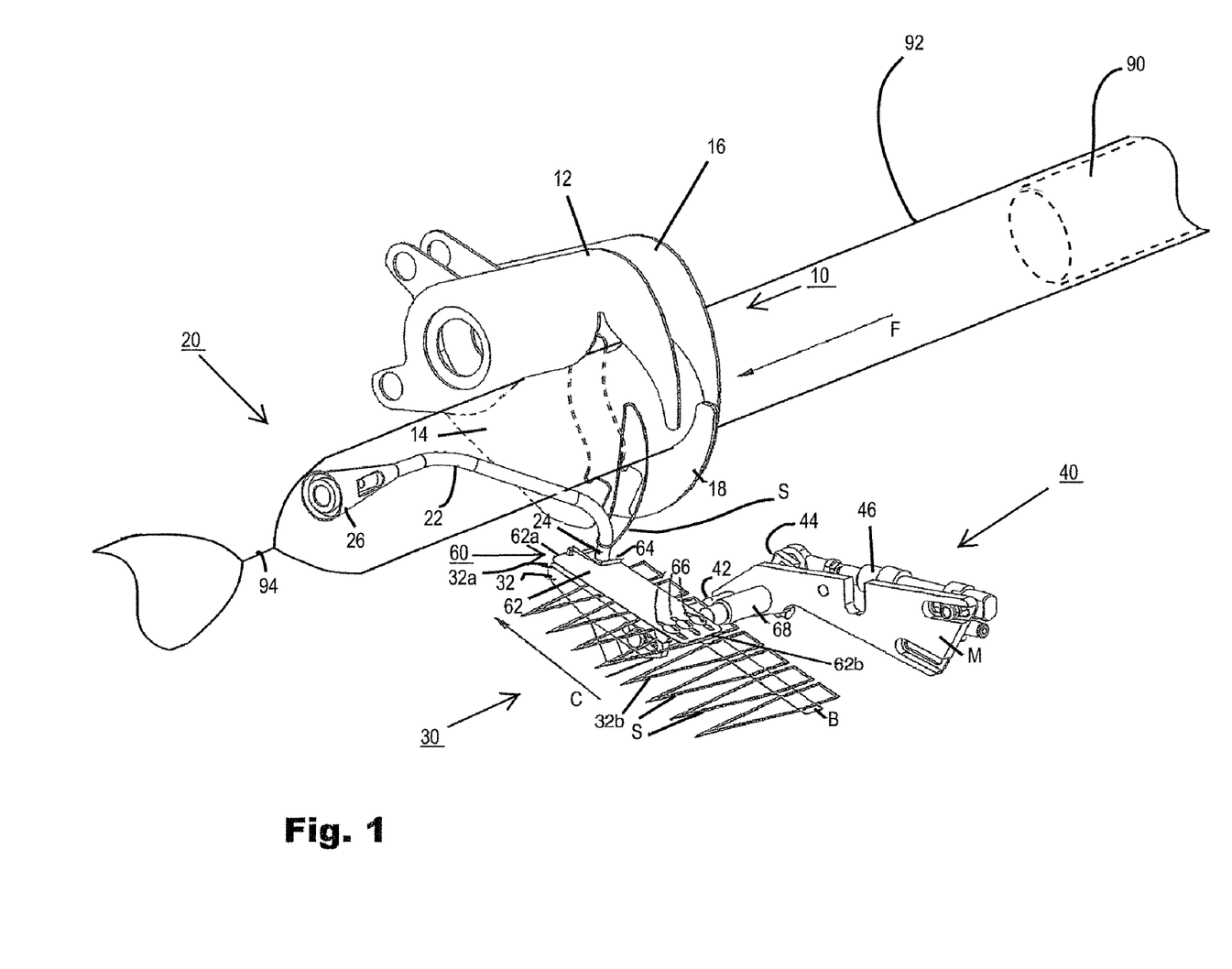
FIG. 1: is a schematic and perspective view of the essential parts of a system according to a first embodiment the present invention.

FIG. 1 shows a schematic and perspective view of the essential parts of a system for allowing a quality check of sausage-shaped products, like sausages, according to a first embodiment the present invention. The system substantially comprises a filling tube 90 for feeding filling material, like sausage meat, in a feeding direction F to a tubular packing casing 92 provided on the filling tube and closed at the front end by a closure means, like a closure clip, a clipping machine 10 and a transportation unit 20. Details of these devices are described in the following.

With the clipping machine 10, sausage-shaped products are produced in a known manner. As mentioned above, the tubular packing or packaging casing 92 is provided on the filling tube 90 and is closed at its front end by the closure means, like a closure clip. The filling tube is positioned upstream to a displacer unit 12, 14, 16, 18 of the clipping machine 10, that means on their right side in FIG. 1. Filling material, like sausage meat, is fed through the filling tube 90 in a feeding direction F and filled into the tubular packaging casing 92 which is thereby pulled off from the filling tube. After a predetermined portion of filling material has been fed into the tubular casing, said filled tubular casing is gathered by displacer unit 12, 14, 16, 18 which comprises two pairs of displacer elements 12, 14 and 16, 18, whereby a plait-like portion 94 of casing material is formed between the pairs of displacer elements 12, 14 and 16, 18, and which is at least approximately free from filling material. According to FIG. 1, displacer unit 12, 14, 16, 18 of clipping machine 10 comprises two pairs of displacer elements 12, 14 and 16, 18 of upper and lower displacer shears 12, 16 and 14, 18, for gathering the filled tubular packing material fed in feeding direction F and for providing a plait-like portion 94 which is approximately free from filling material.

Two closure means or closure clips, respectively, are attached to the plait-like portion by a clipping unit (also not shown in FIG. 1). The clipping unit is positioned between the two pairs of displacer elements 12, 14 and 16, 18. One of the closure clips closes the second end of the sausage-shaped product presently produced filled actually and the second closure clip closes the front end of the tubular casing remaining on the filling tube and forming the following sausage-shaped product.

A suspension element S provided to the clipping unit by a feeding unit 30, is attached to the presently produced sausage-shaped product by one of the two closure clips. A cutting unit (also not shown) may cut the plait-like portion between the two closure clips for separating the sausage-shaped product actually produced from the remaining tubular casing material. The suspension element S is caught by a catching element 22 of transportation unit 20 for transporting the actually produced sausage-shaped product out of the clipping machine 10. Said sausage-shaped product may be fed to a storage device which may include e.g. a smoking rod for pendulous storing the sausage-shaped product.

Subsequent to displacer unit 12, 14, 16, 18 and in feeding direction F, transportation unit 20 is arranged for transporting the sausage-shaped product out of clipping machine 10. In FIG. 1, only the catching element 22 of the transportation device 20 is shown. The catching element 22 is of a circular cross-section and extends approximately from the closing region of the clipping machine 10, where the closing clip is applied to the plait-like portion of the filled and gathered tubular packing material, away from the clipping machine 10 in the feeding direction F. The catching element 22 has a first end or tip 24 directed towards the clipping machine 10 in a downward direction so that it has the shape of a hook, and a second end 26 directed away from the clipping machine 10 and being coupled to further elements of the transportation unit 20, e.g. a guide rail.

As already mentioned above, clipping machine 10 comprises the feeding unit 30 for feeding flexible suspension elements S, like loops, in a conveying direction C to the clipping machine 10 for being attached to the sausage-shaped product by means of the first or second closing clip. Conveying direction C is approximately perpendicularly arranged to feeding direction f. Feeding unit 30 comprises a positioning device 32, which extends longitudinally in the conveying direction C and which is arranged with one end below tip 24 of catching element 22. Positioning device 32 comprises a first end 32a, which is directed towards clipping machine 10. The second end 32b of approximately horizontally aligned positioning device 32 of feeding unit 30 is directed away from the clipping machine 10. A carrier belt B is guided around positioning device 32. On carrier belt B, suspension elements or loops S are subsequently arranged in regular intervals and are aligned at least approximately perpendicular to conveying direction C. Belt B is guided around positioning device 32 in a manner as to rest at least on the upper surface of positioning device 32 between the first and second end 32a, 32b. Belt B is moved in conveying direction C as to stepwise slide across the upper surface of positioning device 32, thereby placing a loop S in a position below tip 24 of catching element 22.

Moreover, positioning device 32 comprises a drive 40 coupled to the second end 32b of positioning device 32 by an axis 42. Drive 40 which is a pivot drive, comprises a pivot lever 44 coupled at one end to pivot axis 42 and at the second end to a drive element 46, which, in the present embodiment, is a piston/cylinder drive element. Positioning device 32 may be reversibly pivoted between an upper and a lower position, wherein, in the upper position, positioning device 32 is disposed closed to tip 24 of catching element 22 and, in the lower position, positioning device 32 is moved away from tip 24 of catching element 22. In the upper position, loop S is positioned closer to catching element 22 to assure a save catching of loop S. In the lower position of positioning device 32, belt B together with loops S may be moved forward without being engaged by catching element 22. Drive 40 and pivot axis 42 are mounted by a frame element or mounting bracket M to clipping machine 10.

Figure 3:
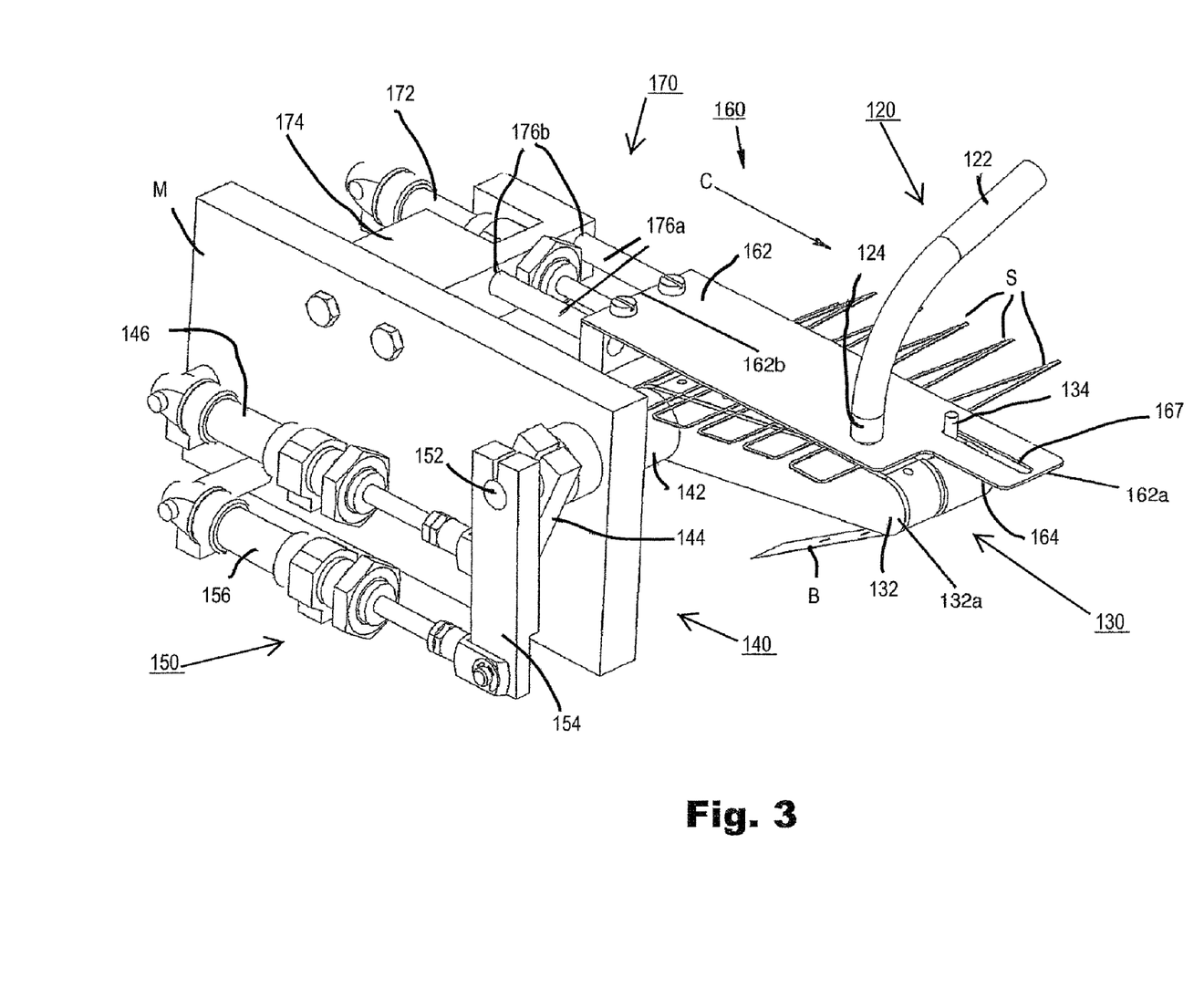
FIG. 3: is a schematic and perspective view to the feeding unit and the discharge device of FIG. 2, with the discharge device in the engaging position according to the present invention.

As it further can be inferred from FIG. 1, clipping machine 10 comprises a discharge device 60 including an engagement element 62 having a first end 62a facing clipping machine 10 and a second end 62b facing away from clipping machine 10 and a drive (not shown in FIG. 1) for moving engagement element 62. Engagement element 62 is formed by a flat and at least approximately rectangular element which may be made of metal or plastic. At the edge 62a directed towards the closing region of clipping machine 10, engagement element 62 comprises a recess 64 for releasing the suspension loop S disposed in the position to be fixed to a sausage-shaped product, when positioned in the release position. In the region of end 62b facing away from clipping machine 10, engagement element 62 comprises tree slots 66 arranged parallel to each other and also parallel to conveying direction C. A mounting pin 68 is arranged at mounting bracket M above positioning device 32 and parallel to pivot axis 42. Engagement element 62 is coupled to mounting pin 68 by respective screws engaging slots 66. Discharge device 62 may reversibly be moved from the release position as shown in FIG. 1 into an engaging position (as shown in FIG. 3 in conjunction with the second embodiment of the clipping machine) in the conveying direction C towards clipping machine 10, wherein engagement element 62 is positioned below tip 24 of catching element 22 for preventing a suspension loop S to be caught by catching element 22. While reversibly moving engagement element 62 from the release position into the engaging position, discharge element 62 is shifted along slots 66 by a respective drive (not shown in FIG. 1). Thus, by moving the engagement element 62 into the engaging position, the catching of suspension loop S of the sausage-shaped product is prohibited and said product by-passes the transportation unit 20 and can be fed to a measuring device for measuring e.g. its weight, length, diameter etc.

In the following description of the second embodiment of the present invention as shown in FIGS. 2 to 6, parts which have identical functions like parts of the first embodiment according to FIG. 1, are denoted with identical reference numbers each increased by 100. Moreover, parts of clipping machine 10, not shown in FIGS. 2 to 6 are identical to the respective parts shown in FIG. 1.

Figure 2:
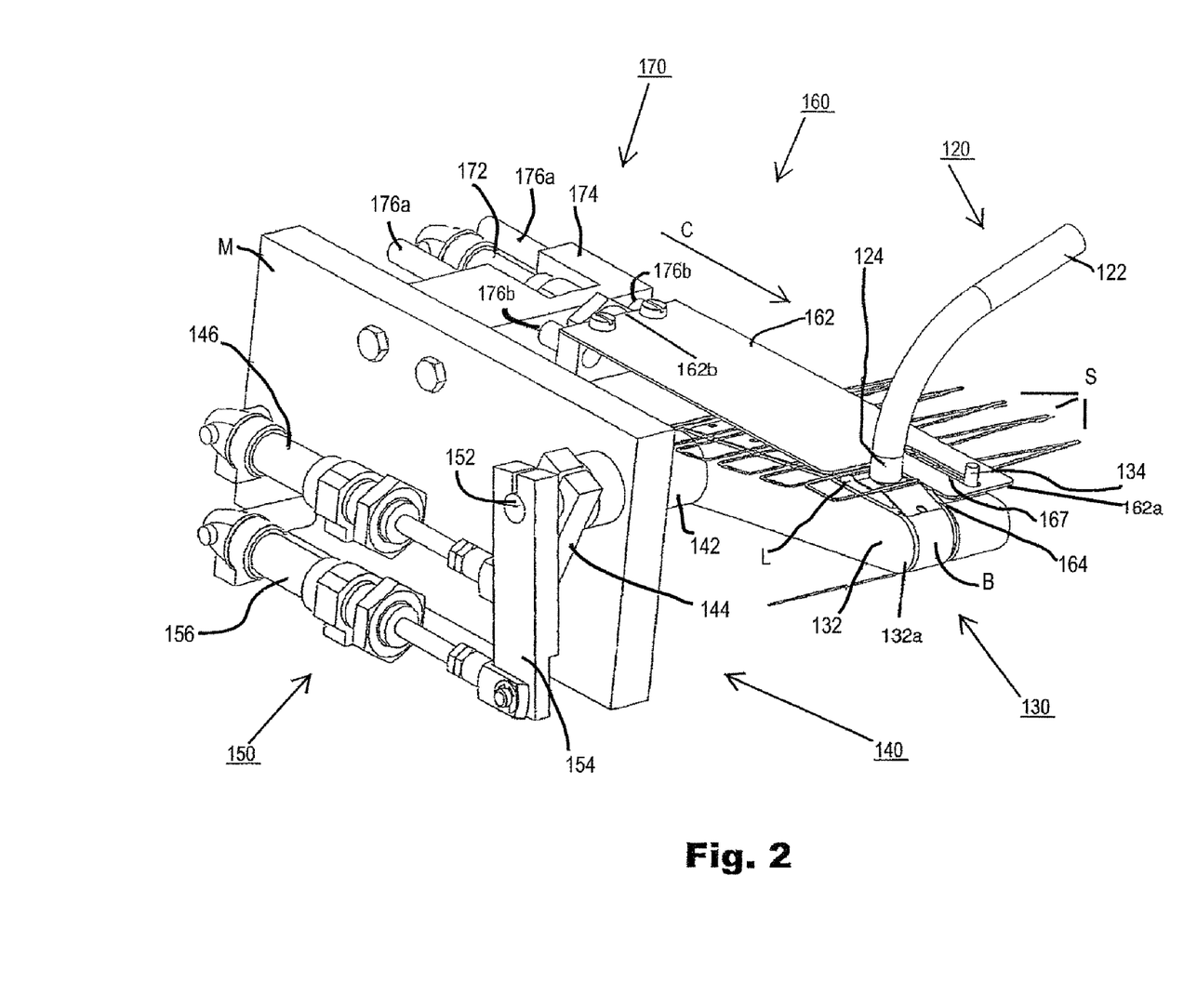
FIG. 2: is a schematic and perspective view to a second embodiment of a system according to the present invention, whereas, in FIG. 2, only a feeding unit and a discharge device in the release position are shown.

FIG. 2 shows a perspective view to the second embodiment of the inventive system. In FIG. 2, only feeding unit 130 and discharge device 160 in the release position are shown. Feeding unit 130 comprises a positioning device 132 having a first end 132a facing to the clipping machine and a second end 132b facing away from the clipping machine. Positioning device 132 is coupled at its second end 132b to pivot drive 140 by pivot axis 142 and pivot lever 144. In FIG. 2, positioning device 132 is in the upper position that means, its first end 132a is positioned close to tip 124 of catching element 122 of transportation device 120, and also close to engagement element 162 of discharge device 160.

Discharge device 160 comprises a linear drive 170 for reversibly moving engagement element 162 parallel to conveying direction C between the release position and the engaging position. Engagement element 162 has a first end 162a facing to the clipping machine and a second end 162b facing away from the clipping machine. Drive 170 is coupled to the second end 162b of engagement element 162. Drive 170 includes a linear drive element 172 in form of a piston/cylinder drive which is attached to mounting bracket M by a holder 174. Holder 174 includes linear guide means 176 composed of cylindrical pins 176a guided in cylindrical holes 176b in holder 174.

As it can be inferred from FIG. 2, positioning device 132 comprises a guide pin 134 vertically arranged at to top of the first end 132a of positioning device 132. Guide pin 134 engages a slot 167 arranged beside recess 164 in engagement element 162 and aligned at least approximately parallel to conveying direction C. The length of slot 167 fits to the length of the path way for moving discharge element 162 between the release position and the engaging position.

As it further can be inferred from FIG. 2, feeding unit 130 comprises a second drive 150 which couples the positioning device 132 via a second pivot axis 152 and a pivot lever 154 to a piston/cylinder drive 156 mounted at mounting bracket M. A lifter L is incorporated into positioning device 132 which is coupled to and pivoted by second drive 150. Pivot axis 142 of pivot drive 140 is built as a hollow axis through which pivot axis 152 of second drive 150 is guided and supported. Lifter L will be described in more detail in conjunction with FIGS. 5 and 6 below.

FIG. 3 shows a perspective and schematic view to feeding unit 130 and discharge device 160, with discharge device 160 in the engaging position. In contrast to FIG. 2, engagement element 162 is moved to the right in the conveying direction C. Thereby, discharge element 162 is positioned between the suspension loop S held in a position to be attached to the actually produced sausage-shaped product and tip 124 of catching element 122. Guide pin 134 engaging slot 167 of engagement element 162, guides engagement element 162 when moved between the release position and the engaging position and prevents engagement element 162 from leaving its linear path way. Additionally, guide pin 134 prevents suspension loop S from erroneously being caught by one of the corners of the first end 162a of engagement element 162, when pulled off from belt B while being attached to the sausage-shaped product.

Figure 4:
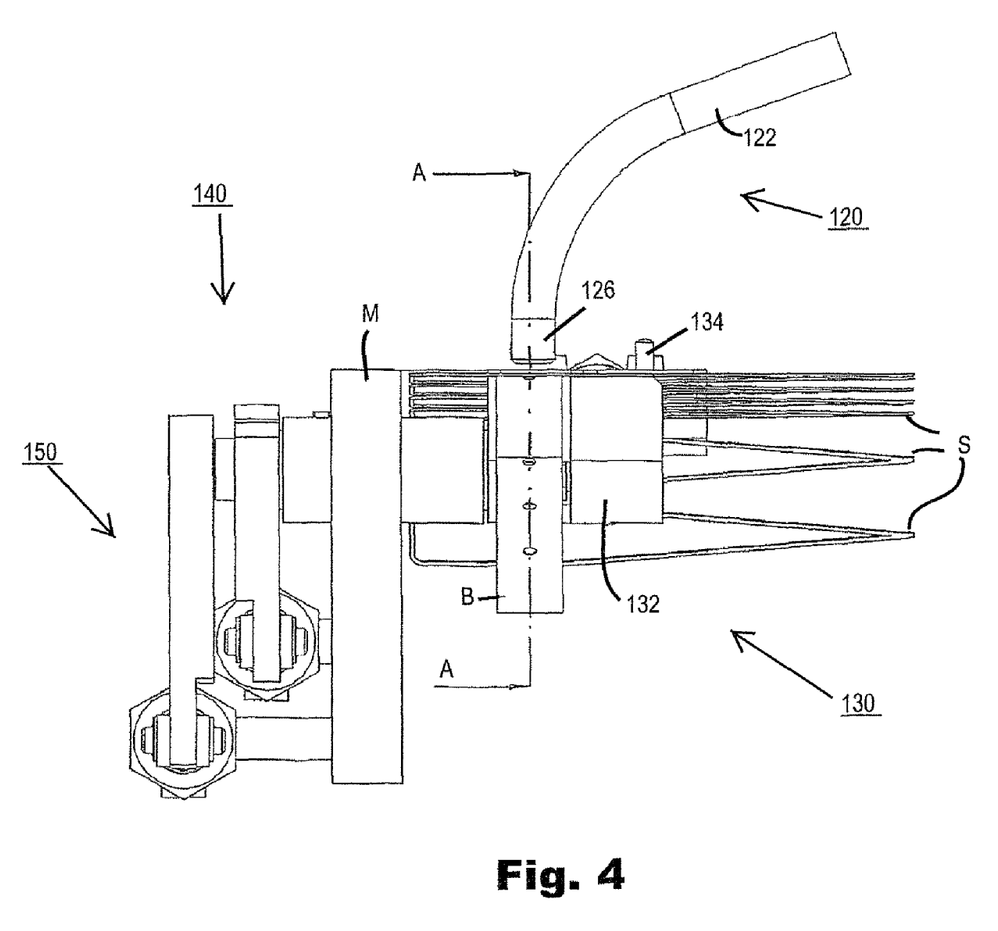
FIG. 4: is a schematic front view to the feeding unit and the discharge device according to FIGS. 2 and 3.

FIG. 4 shows a schematic front view of the feeding unit 130 and the discharge device 160 according to FIGS. 2 and 3, seen from the closing region of the clipping machine. For clarification matter, only some essential parts and assemblies are denoted, like catching element 122 with tip 124, feeding unit 130 with positioning device 132 and guide pin 134, carrier belt B guided around positioning device 132 and mounting bracket M with pivot drives 140 and 150 attached thereto.

Figure 5:
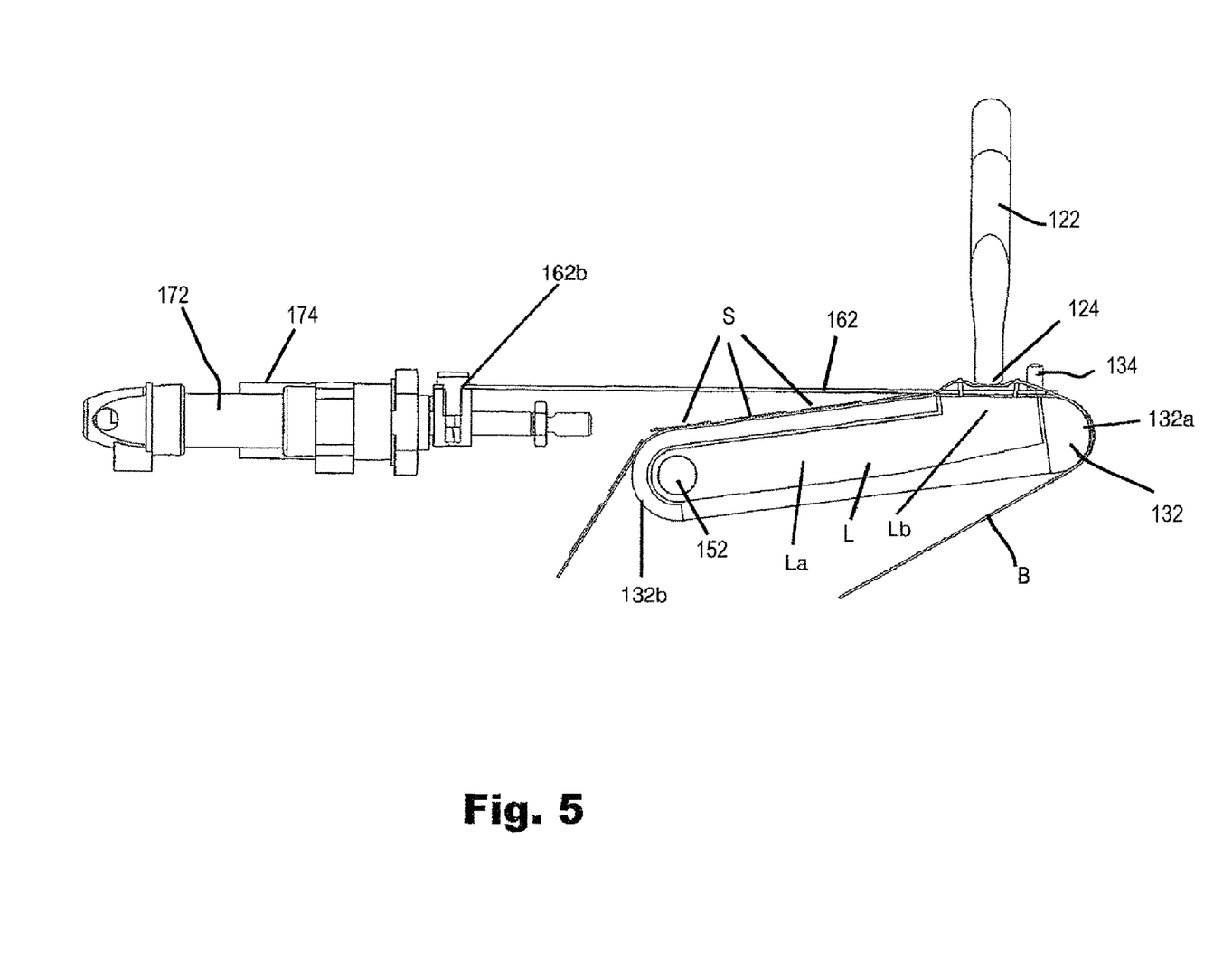
FIG. 5: is a schematic cross-section view to the feeding unit and the discharge device along line A-A in FIG. 4, with the discharge device in the release position as shown in FIG. 2.

FIG. 5 is a cross-section view of feeding unit 130 and discharge device 160 along line A-A in FIG. 4, with discharge device 160 in the release position as shown in FIG. 2. As mentioned above, lifter L is incorporated in positioning device 132. Lifter L is of a generally L-shaped configuration and at least approximately horizontally arranged inside positioning device 132 which is formed by a hollow container or the like. Lifter L has a longer arm La and a shorter arm Lb. The left end of the longer arm La of lifter L, according to FIG. 5, is coupled to pivot axis 152 of pivot drive 150. The shorter arm Lb of lever L is nearly vertically arranged and projects through a hole in the upper surface of positioning device 132 below tip 124 of catching element 122. In FIG. 5, positioning device 132 and lifter L are in their upper position. That means, positioning device 132 and lifter L are pivoted counterclockwise, whereby the right end of positioning device 132 abuts the lower side of engagement element 162 and the shorter arm Lb of lifter L projects above engagement element 162. By projecting engagement element 162, lifter L touches tip 124 of catching element 122 and closes the gap between carrier belt B and tip 124. Upper surface of arm Lb of lifter L has a contour matching with tip 124 to improve the contact between Lifter L and tip 124.

Figure 6:
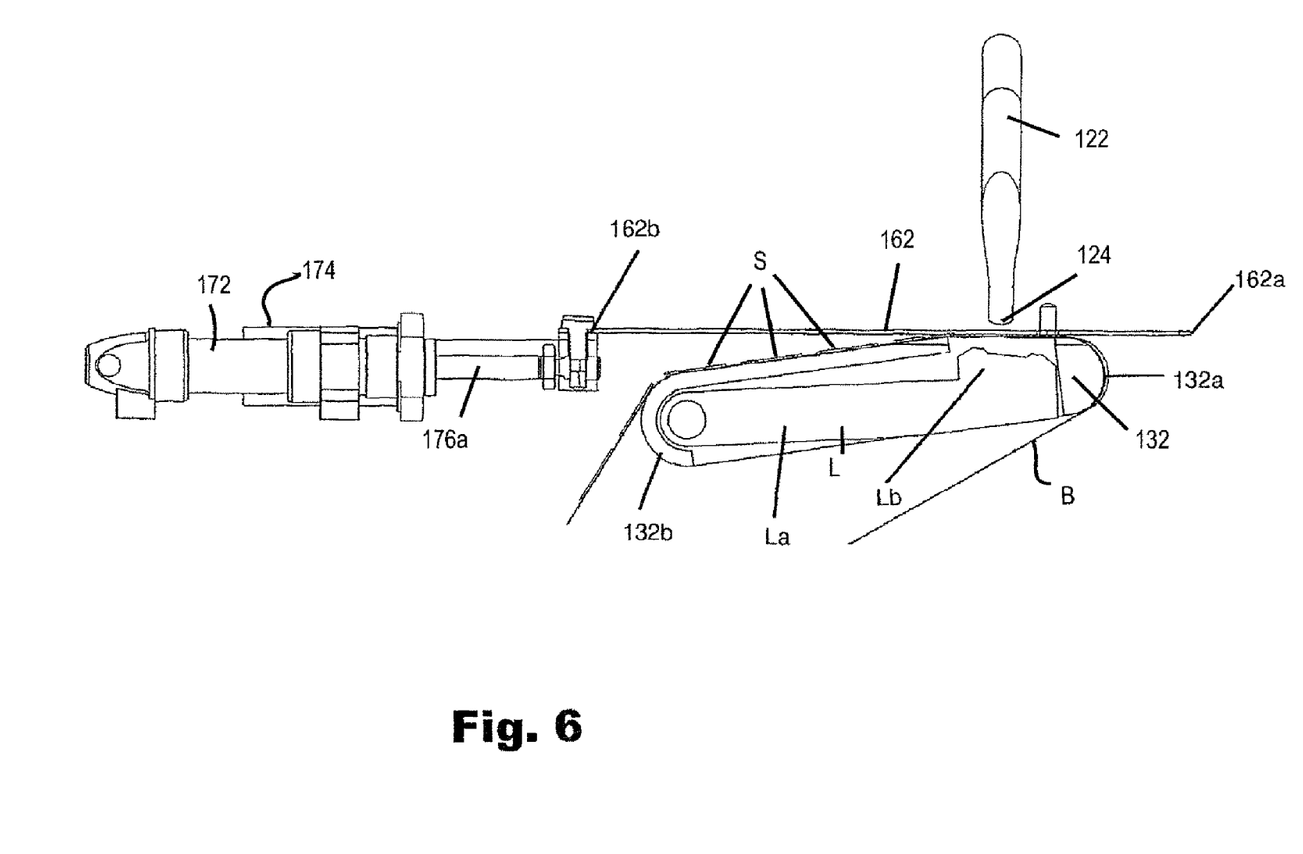
FIG. 6: is a schematic cross-section view to the feeding unit and the discharge device along line A-A in FIG. 4, with the discharge device in the engaging position as shown in FIG. 3.

In FIG. 6, which shows a schematic cross-section view of feeding unit 130 and discharge device 160 along line A-A in FIG. 4, discharge device 160 is in the engaging position as shown in FIG. 3. Positioning device 130 is pivoted counterclockwise as to touch the lower side of engagement element 162. Lifter L has been pivoted clockwise into its lower position. In this position, the shorter arm Lb of lifter L does not project positioning device 132.

In the course of the production of sausage-shaped products in the system according to the present invention, filling material, like sausage meat, is fed in a known manner in the feeding direction F through the filling tube into the tubular casing packing provided on the filling tube. Said tubular packing casing is closed at its front end by a first closure means like a closure clip. After a predetermined volume of sausage meat is filled into the packaging casing, said filled casing is gathered by displacer elements 12, 14 and 16, 18 of displacer unit 12, 14, 16, 18 of clipping machine 10, thereby forming a plait-like portion, which is approximately free from sausage meat. The clipping unit applies two closure clips to the plait-like portion, a first closure clip for closing the actually filled packing casing section and a second closure clip for closure the front end of the packing casing provided on the filling tube. Feeding unit 30, 130 feeds flexible suspension elements S, like loops, to clipping machine 10 for being attached to the presently produced sausage-shaped product by means of the first or second closure clip. Suspension loop S just fixed to the sausage-shaped product, is caught by catching element 22, 122 of transportation unit 20, 120 for transporting the sausage-shaped product out of clipping machine 10 to a storing device including e.g. a smoking rod for pendulous storing the sausage-shaped product thereon.

When feeding a suspension loop S to clipping machine 10, positioning device 32, 132 is moved into its lower position and carrier belt B, with loops S attached thereto in regular intervals, is moved forward about a length corresponding to the distance between two suspension loops S at belt B. Thereby, a suspension loop S is positioned below tip 24, 124 of catching element 22, 122, to be attached to the sausage-shaped product and to be caught by catching element 22, 122 for guiding the sausage-shaped product along transportation unit 20, 120 to a storage device. After positioning suspension loop S, positioning device 32, 132 is moved in its upper position abutting the lower side of engagement element 62, 162.

Subsequently, lifter L, if present as described in conjunction with the second embodiment of the present invention, is pivoted from its lower position into its upper position. Thereby the shorter arm Lb of lifter L projects engagement element 162 and lifts belt B together with suspension loop S by its upper surface toward tip 124 of catching element 122. Upper surface of shorter arm of Lifter L is formed to be engaged by tip 124 and thereby to close the gap between suspension loop S and tip 124 to enable a sure catching.

After the sausage-shaped product has been produced and carried out of the clipping machine, lifter L, if present, and positioning device 30, 130 are moved in their lower position. Carrier belt B is moved forward about a length corresponding to the distance between two suspension loops S at belt B and positioning device 32, 132 is moved in its upper position abutting the lower side of engagement element 62, 162. Subsequently, lifter L is again pivoted from its lower position into its upper position.

In the production of sausage-shaped products, it is necessary to check at least the basic dimensions of the sausage-shaped product, like the length or the weight, in individual or in regular intervals to avoid unnecessary losses or waste. To allow a sausage-shaped product to be measured, it has to be discharge from the production line. To minimize the additional costs, the discharge process should not influence the current production process.

To discharge a sausage-shaped product from the present clipping machine 10, engagement element 62, 162 is moved from the release position as shown in FIG. 2 into the engaging position according to FIG. 3. Thereby, the suspension loop S actually in the position to be attached to the sausage-shaped product currently produced is covered by engagement element 62, 162. Engagement element 62, 162, acting as a deflector device, prevents suspension loop S from being caught by catching element 22, 122 and from being transported out of the clipping machine to a storage device. Said sausage-shaped product is by-passed at catching element 22, 122. That means, suspension element S may not be caught by catching element 22, 122. Said sausage-shaped product may be guided out of the clipping machine by a separate guide device, like a chute, to a measuring station.

After the suspension loop S has been attached to the sausage-shaped product, positioning device 30, 130 is moved in its lower position and carrier belt B is moved forward about a length corresponding to the distance between two suspension loops S at belt B. Engagement element 62, 162 is moved back into the release position. Positioning device 32, 132 is moved in its upper position abutting the lower side of engagement element 62, 162. Subsequently, lifter L is pivoted from its lower position into its upper position.

As described above, according to the second embodiment as shown in FIGS. 2 to 6, positioning device 130 comprises a lifter L for being moved between an upper and a lower position for closing the gap between the suspension loop S and the tip 124 of catching element 122. The positioning device must not necessarily comprise a lifter, as it can be seen in the first embodiment of positioning device 30 of FIG. 1. In this case, all steps for producing a sausage-shaped product and for discharging a sausage shaped-product from the present system are equal to that described above, except the steps of moving lifter L.

The system according to the present invention may further comprise a control unit (not shown). Said control unit may run a program for executing the above described steps for producing sausage-shaped products and for by-passing a single sausage-shaped product or a series of said products at the catching element for discharging said sausage-shaped products out of the system. Alternatively or additionally, it is possible to manually discharge sausage-shaped product out of the system by a respective actuation button.

The drives 140, 150 170 are described as piston/cylinder assemblies. Such piston/cylinder assemblies may be hydraulically or pneumatically driven. Naturally, said drives may also be electrical drives like stepper motors or the like.

The movement of the engaging element is not limited to be linearly. A pivot drive may be included for pivoting the engaging element e.g. in its horizontal plane between a release position and an engaging position.

The discharge device is presently described as being fixedly mounted to a frame element or a mounting bracket of the system or the clipping machine. The discharge device may also be provided as a separate apparatus which may be adapted to existing production systems and their control unit, respectively.

Alternatively to the engagement element to be positioned between the actually used suspension loop and the catching element, the catching element itself may be movable, e.g. pivotable in a manner to be not positioned by its tip above the actual suspension loop.

The invention claimed is:

1. A system for allowing a quality check of sausage shaped products comprising:
   a filling tube for feeding filling material in a feeding direction into a tubular packing casing provided on the filling tube and closed at the front end by a closure means,
   a clipping machine having a displacer unit with at least two pairs of displacer elements for gathering the filled tubular packing casing and for providing a plait-like portion which is at least approximately free from filling material, and at which two closure means have to be applied,
   a first closure means for closing an actually filled tubular packing casing for forming a sausage-shaped product to be produced presently,
   a second closure means for closing the front end of the tubular packing casing provided on the filling tube and forming the following sausage-shaped product to be produced next, and
   a feeding unit for feeding flexible suspension elements for attachment to the sausage-shaped product by means of the first or second closure means, wherein the feeding unit includes a positioning device for positioning the flexible suspension element to be attached to the sausage-shaped product, and further comprising a transportation unit for transporting the sausage-shaped product out of the clipping machine to a storing device,
   wherein the system comprises a discharge device for by-passing the transportation unit by at least one of the sausage-shaped products and for discharging the by-passed sausage-shaped product out of the clipping machine.

2. The system according to claim 1, wherein the transportation unit has at least a catching element for catching the suspension element and that the discharge device is adapted to by-pass a sausage-shaped product at the catching element.

3. The system according to claim 1, wherein the discharge device comprises an engagement element which is reversibly movable between a release position in which the engaging element releases the flexible suspension element actually to be attached to the sausage-shaped product and to be caught by the catching element, and an engaging position in which the engagement element is disposed between the flexible suspension element actually to be attached to the sausage shaped product and the catching element of the transportation unit.

4. The system according to claim 3, wherein the engagement element is reversibly movable in the conveying direction of the suspension elements.

5. The system according to claim 3, wherein the engagement element is reversibly movable at least approximately in the feeding direction of the filling material.

6. The system according to claim 3, wherein the engagement element is reversibly rotatable about a vertical axis, which is arranged at least approximately perpendicular with respect to the feeding direction of the filling material.

7. The system according to claim 1, wherein the positioning device comprises a guide pin for reversibly guiding the engagement element between the release position and the engaging position.

8. The system according to claim 1, wherein the positioning device comprises a pivot axis for reversibly pivoting the positioning device between an upper and a lower position, wherein, in the upper position, the positioning device is disposed closed to the catching element, and in the lower position, the positioning device is moved away from the catching element.

9. The system according to claim 1, wherein the positioning device comprises a lifter for locating a flexible suspension elements closed to the catching element.

10. The system according to claim 9, wherein the lifter comprises a pivot axis, for reversibly pivoting the lifter between an upper and a lower position inside the positioning device, wherein, in the upper position, the positioning device is disposed closed to the catching element, and in the lower position, the positioning device is moved away from the catching element.

11. The system according to claim 10, wherein the lifter comprises a notch which exceeds the positioning device in the region of the catching element, when the lifter is in the upper position.

12. The system according to claim 1, further comprising at least one drive for automatically driving the discharge device and/or the positioning device and/or the lifter.

13. A method for allowing a quality check of sausage-shaped products, wherein the sausage-shaped products are produced with a system which comprises a filling tube for feeding filling material in a feeding direction into a tubular packing casing provided on the filling tube and closed at the front end by a closure means a clipping machine having a displacer unit with at least two pairs of displacer elements for gathering the filled tubular packing casing and for providing a plait-like portion which is at least approximately free from filling material, for applying two closure means to the plait-like portion of the tubular packing casing, a first closure means for closing an actually filled tubular packing casing for forming a sausage-shaped product to be produced presently, and a second closure means for closing the front end of the tubular packing casing provided on the filling tube and forming the following sausage-shaped product to be produced next, and a feeding unit for feeding flexible suspension elements to the clipping unit for being attached to sausage-shaped products by means of the first or second closure means, wherein the feeding unit includes a positioning device for positioning the flexible suspension element to be attached to the sausage-shaped product, and wherein the sausage-shaped products are fed out of the clipping machine by a transportation unit for transporting the sausage-shaped product out of the clipping machine to a storing device, the method comprises the steps of:

provoking at least one sausage-shaped product, providing a discharge device, and by-passing the transportation unit by at least one of the sausage-shaped products, and discharging the bypassed sausage-shaped product out of the clipping machine.

14. The method according to claim 13, wherein the by-passing of the sausage-shaped product is carried out by blocking the path way of the suspension element between the feeding unit and the transportation unit.

15. The method according to claim 13, wherein the discharge device includes an engagement element, and wherein the method includes the further step of:

reversibly moving the engagement element between a release position in which the engagement element releases the flexible suspension element actually to be attached to the sausage shaped product and to be caught by a catching element of the transportation unit, and an engaging position in which the engagement element is disposed between the flexible suspension element actually to be attached to the sausage shaped product and the catching element of the transportation unit.

* * * * *